(12) United States Patent
Lin et al.

(10) Patent No.: US 9,318,059 B2
(45) Date of Patent: Apr. 19, 2016

(54) ELECTROPHORETIC DISPLAY AND DRIVE METHOD THEREOF

(75) Inventors: Yongqiang Lin, Guangdong (CN); Zuliang Liu, Guangdong (CN); Sheng Su, Guangdong (CN); Jianming Liao, Guangdong (CN)

(73) Assignee: Guangzhou OED Technologies Co., Ltd. (CN)

( * ) Notice: Subject to any disclaimer, the term of this patent is extended or adjusted under 35 U.S.C. 154(b) by 390 days.

(21) Appl. No.: 13/638,704

(22) PCT Filed: Nov. 23, 2010

(86) PCT No.: PCT/CN2010/078989
§ 371 (c)(1),
(2), (4) Date: Dec. 24, 2012

(87) PCT Pub. No.: WO2011/120307
PCT Pub. Date: Oct. 6, 2011

(65) Prior Publication Data
US 2013/0135363 A1    May 30, 2013

(30) Foreign Application Priority Data
Apr. 1, 2010   (CN) .......................... 2010 1 0141549

(51) Int. Cl.
*G09G 3/34*    (2006.01)
(52) U.S. Cl.
CPC ........ *G09G 3/344* (2013.01); *G09G 2320/0204* (2013.01)
(58) Field of Classification Search
CPC ....................... G09G 2320/0276; G02F 1/167
USPC ........................................................ 345/690
See application file for complete search history.

(56) References Cited

U.S. PATENT DOCUMENTS

2003/0137521 A1*   7/2003   Zehner et al. ................ 345/589

FOREIGN PATENT DOCUMENTS

| CN | 1589462 A | 3/2005 |
|---|---|---|
| CN | 101364381 A | 2/2009 |
| WO | 2007135594 A1 | 11/2007 |
| WO | 2009021358 A1 | 2/2009 |

OTHER PUBLICATIONS

International Search Report from corresponding application PCT/CN2010/078989, mailed by the Patent Office of China on Mar. 3, 2011, 6 pages.

* cited by examiner

*Primary Examiner* — Kent Chang
*Assistant Examiner* — Chayce Bibbee
(74) *Attorney, Agent, or Firm* — James E. Walton

(57) ABSTRACT

The present invention discloses an electrophoretic display and a driving met hod thereof, comprising: arranging each pixel electrode in the electrophoretic display to correspond to a pixel; determining a driving waveform of the electrophoretic display based on the initial gray level and the final gray level of the pixel, applying a display signal of the driving waveform to the pixel electrode, controlling the pixel whose gray level value needs to be changed; wherein the driving waveform comprises at least one gray level driving procedure, each driving procedure corresponds to a gray level changing direction, the final gray level is a gradually changing gray level in the gray level changing direction which the last driving procedure corresponds to. The present invention can realize relatively accurate control to the gray level change while keeping DC balance by means of the electrophoretic display and the driving method thereof when the screen is refreshed.

5 Claims, 6 Drawing Sheets

ELECTROPHORETIC DISPLAY AND DRIVE METHOD THEREOF

BACKGROUND

1. Field of the Invention

The present invention relates to the field of display, particularly to an electrophoretic display and a driving method thereof.

2. Description of Related Art

The electrophoretic display is a relatively earlier developed display technology of paper-like display, which presents display effect of different colors using colored charged particles moving in a liquid environment by means of an external electric field. When the electric field is removed, the display will maintain the displayed image so as to realize stable display.

The electronic paper usually adopts the electrophoretic display, since it is very similar to ordinary paper, i.e., with performances of high contrast, wide view angle, low energy consumption and high reading comfortability, etc., it has been widely used in many fields.

The electrophoretic display has been able to display black-and-white or even colored images, and there are also many intermediate gray levels between black and white, for example, darkish, dark grey, grey etc., thereby a complete image can be displayed by controlling the respective pixels on the display screen to corresponding gray levels.

Currently, a driving voltage is generally applied directly based on the final gray level value to control the pixel to display a corresponding gray level value by means of a look-up table, however, since electro optical displays have historical dependency, i.e., there may be influence of residual voltage etc., it is difficult to realize accurate gray level control by directly driving way using look-up table, which results in some errors.

Moreover, during the gray level control, if a certain pixel cannot return to the extreme optical state (i.e. black or white) for a long period of time, the error may become larger and larger. In addition, when applying driving voltages to the gray level control, it is necessary to keep DC (direct current) balance, which means the time integration sum of the positive voltage and negative voltage applied on the pixel is zero for a predetermine period, otherwise, the electrode and the display medium may be damaged.

Therefore, it is necessary to provide a technical solution of driving the electrophoretic display so as to solve the said problem.

SUMMARY OF THE INVENTION

Figure 1:
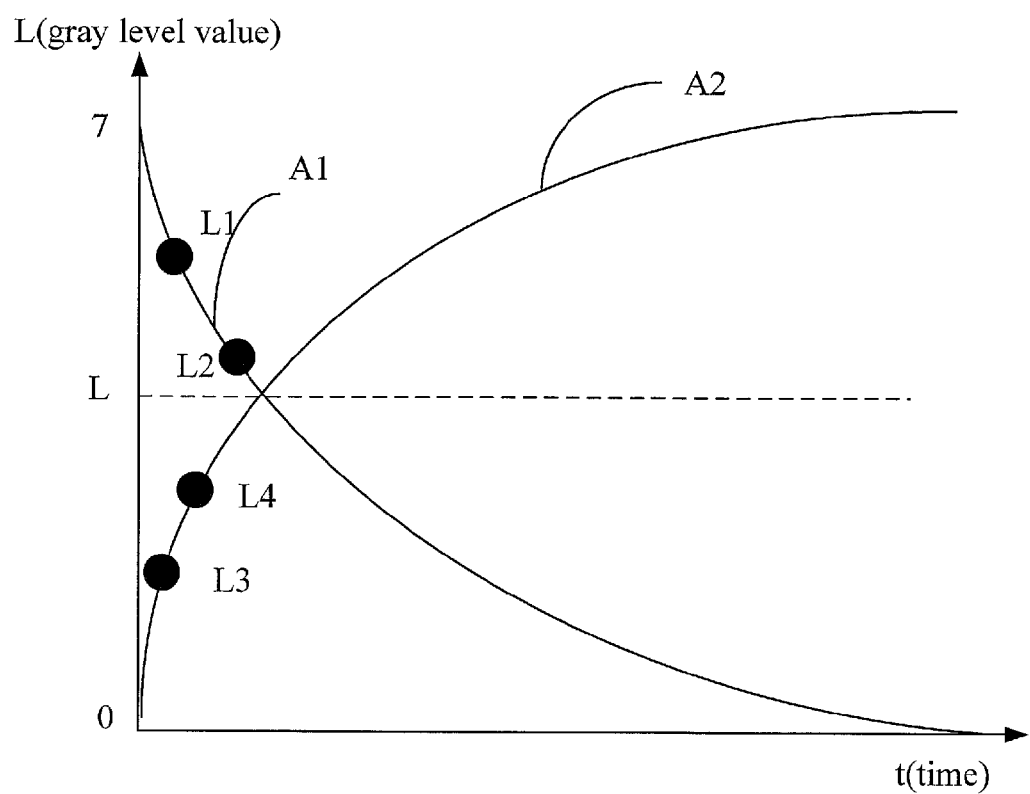
FIG. 1 is a curve of the characteristics of the electronic ink adopted in the electrophoretic display of the present invention.

The objective of the invention is to provide an electrophoretic display and a driving method thereof, which can perform relatively accurate control to the gray level change while keeping DC balance.

In order to solve said problem, the present invention provides a method of driving an electrophoretic display, comprising: arranging each pixel electrode in the electrophoretic display to correspond to a pixel; determining a driving waveform of the electrophoretic display based on the initial gray level and the final gray level of a pixel, applying a display signal of the driving waveform to the pixel electrode, controlling the pixel whose gray level value needs to be changed; wherein the driving waveform comprises at least one gray level driving procedure, each driving procedure corresponds to a gray level changing direction, the final gray level is a gradually changing gray level in the gray level changing direction which the last driving procedure corresponds to.

Further, the method may further comprise that, the steps of determining a driving waveform of the electrophoretic display based on the initial gray level and the final gray level of a pixel, applying a display signal of the driving waveform to the pixel electrode, controlling the pixel whose gray level value needs to be changed are specifically divided into the following steps: driving the pixel so as to make its gray level change from the initial gray level to an extreme gray level in the manner of meeting DC balance; determining a gray level changing direction based on the extreme gray level and the final gray level of the pixel; determining whether the final gray level is a gradually changing gray level in the gray level changing direction; if yes, driving the pixel so as to make its gray level change from the extreme gray level to the final gray level; if not, driving the pixel so as to make its gray level change from the extreme gray level to the other extreme gray level, and then driving the pixel from the other extreme gray level to the final gray level.

Further, the method may further comprise that the steps of determining a driving waveform of the electrophoretic display based on the initial gray level and the final gray level of a pixel, applying a display signal of the driving waveform to the pixel electrode, controlling the pixel whose gray level value needs to be changed are specifically divided into the following steps: determining a first gray level changing direction of direct driving based on the initial gray level and the final gray level of the pixel; determining whether the direct driving meets DC balance in the first gray level changing direction; if the direct driving meets DC balance, continuing to determine whether the final gray level is a gradually changing gray level in the first gray level changing direction; if yes, driving the pixel to change its gray level from the initial gray level to the final gray level directly; if the direct driving does not meet DC balance, or it is determined that the final gray level is not a gradually changing gray level in the first gray level changing direction, driving the pixel so as to make its gray level change from the initial gray level to an extreme gray level in the manner of meeting DC balance; determining a second gray level changing direction based on the extreme gray level and the final gray level of the pixel; determining whether the final gray level is a gradually changing gray level in the second gray level changing direction after the second gray level changing direction is determined; if yes, driving the pixel so as to make its gray level change from the extreme gray level to the final gray level; if not, driving the pixel so as to make its gray level change from the extreme gray level to the other extreme gray level, and then driving the pixel from the other extreme gray level to the final gray level.

Further, the method may further comprise that, the manner of meeting DC balance refers to: during the process of gray level changing of the pixel, if the gray level of the pixel has approached from one extreme optical state to the other extreme optical state, inversely changing of its gray level is not allowed before the gray level of the pixel reaches the other extreme optical state.

The present invention further provides an electrophoretic display comprising: a processing unit and a driving control circuit, wherein the processing unit is used for arranging each pixel electrode in the electrophoretic display to correspond to a pixel, controlling the driving control circuit to conduct the TFT connected to the pixel electrode to which the pixel whose gray level value needs to be changed, and controlling the driving control circuit to apply a driving waveform determined based on the initial gray level and the final gray level of the pixel to the pixel electrode via the conducted TFT, controlling the pixel whose gray level value needs to be changed, wherein the driving waveform comprises at least one gray level driving procedure, each driving procedure corresponds to a gray level changing direction, the final gray level is a gradually changing gray level in the gray level changing direction which the last driving procedure corresponds to; The driving control circuit is used for connecting the TFT, receiving the control signal sent by the processing unit, and refreshing the TFT to display screen.

Further, the electrophoretic display may further comprise that, the processing unit determining the driving waveform to the pixel electrode based on the initial gray level and the final gray level of the pixel and controlling the pixel whose gray level value needs to be changed specifically refers to: the processing unit driving the pixel so as to make its gray level change from the initial gray level to an extreme gray level in the manner of meeting DC balance; the processing unit determining a gray level changing direction based on the extreme gray level and the final gray level of the pixel; determining whether the final gray level is a gradually changing gray level in the gray level changing direction; if yes, driving the pixel so as to make its gray level change from the extreme gray level to the final gray level; if not, driving the pixel so as to make its gray level change from the extreme gray level to the other extreme gray level, and then driving the pixel from the other extreme gray level to the final gray level.

Further, the electrophoretic display may further comprise that, the processing unit determining the driving waveform to the pixel electrode based on the initial gray level and the final gray level of the pixel and controlling the pixel whose gray level value needs to be changed specifically refers to: the processing unit determining a first gray level changing direction of direct driving based on the initial gray level and the final gray level of the pixel; the processing unit determining whether the direct driving meets DC balance; if the direct driving meets DC balance, continuing to determine whether the final gray level is a gradually changing gray level in the first gray level changing direction; if yes, driving the pixel so as to make its gray level change from the initial gray level to the final gray level; if the direct driving does not meet DC balance, or it is determined that the final gray level is not the gradually changing gray level in the first gray level changing direction, driving the pixel so as to make its gray level change from the initial gray level to an extreme gray level in the manner of meeting DC balance; the processing unit determining a second gray level changing direction based on the extreme gray level and the final gray level of the pixel; the processing unit determining whether the final gray level is a gradually changing gray level in the second gray level changing direction after determining the second gray level changing direction; if yes, driving the pixel so as to make its gray level change from the extreme gray level to the final gray level; if not, the processing unit drives the pixel so as to make its gray level change from the extreme gray level to the other extreme gray level, and then drives the pixel from the other extreme gray level to the final gray level.

Further, the electrophoretic display may further comprise that, the processing unit meets DC balance refers to: during the process of controlling the gray level changing of the pixel, the processing unit determining if the gray level of the pixel has approached from one extreme optical state to the other extreme optical state, inversely changing of its gray level is not allowed before the gray level of the pixel reaching reaches the other extreme optical state.

Compared with the prior art, the present invention can realize relatively accurate control to the gray level change while keeping DC balance by means of the electrophoretic display and the driving method thereof when the screen is refreshed.

DETAILED DESCRIPTION OF EMBODIMENT

The present invention will be further explained in combination with the drawings and the embodiments as below.

Please refer to FIG. 1. Generally speaking, the suspensions and display particles comprised in the micro-cavity (including microcapsule, microcup etc.) in the electrophoretic display are called electrophoretic display media. Different electrophoretic display medium have different characteristics. The electrophoretic display medium includes the following types of the medium: the medium containing a transparent suspension, some positive charged particles and some negative charged particles which are dispersed in the transparent suspension, wherein the colors of the two kinds of the particles are different; the medium containing a suspension of one color and charged particles of other color which are dispersed in the suspension; the medium containing a transparent suspension, charged particles of one color and neutral particles of other color which are dispersed in the transparent suspension.

The characteristics of the electrophoretic display media adopted in the present invention are shown in FIG. 1, one pixel of the electrophoretic display is set to display 8 gray levels totally, wherein 7 and 0 represent respectively white and black in the extreme optical state, 1-6 represent gray levels between black and white respectively, for example, 1 represents dark grey, 6 represents light white, etc. The characteristics of the electrophoretic display media of the electrophoretic display of the present invention are: when the gray level of a pixel changes from white to black with driving pulses applied on the pixel, the gray level changing with time follows the first curve A1; when the gray level of a pixel changes from black to white with driving pulses applied on the pixel, the gray level changing with time follows the second curve A2. Wherein, in the curve A1, the changing amplitude of the gray level that is higher than a predetermined gray level value L is very large, while the changing amplitude of the gray level that is lower than the predetermined gray level value L tends to be gradual; in the curve A2, the changing amplitude of the gray level that is lower than a predetermined gray level value L is very large, while the changing amplitude of the gray level that is higher than the predetermined gray level value L tends to be gradual.

Due to the above characteristics of the electrophoretic display media, if the gray level of a pixel changes from L1 to L2, then the gray level change follows the first curve A1, since L1 and L2 are both higher than the gray level L, if it is controlled to change from L1 to L2 directly using a pulse, as shown in the curve A1, during the change of L1-L2, the change amplitude of the gray level is very large, i.e., the gray level of a pixel might go through several gray levels during a short period of time, thereby it cannot be accurately controlled to the final gray level value L2. Similarly, if the gray level of a pixel changes from L3 to L4, it follows the second curve A2, since L3 and L4 are both lower than the predetermined gray level value L, as shown in the curved A2, it also cannot be accurately controlled to the final gray level value L4.

As shown in FIG. 1, if the current gray level value is L1, the final gray level value is L2, the pixel will not be driven directly so as to make its gray level change from L1 to L2, instead, it is ensured that the last pulse drives the pixel so as to make its gray level tend to the gray level value L2 from black (0), so that when the pixel is driven so as to make its gray level be in the vicinity of L2, the gray level changing has already been relatively gradual, even if the pulse time deviates a little bit, the bias of the gray level value will not be too much.

However, the above improvement is not enough, because although the gray level bias is reduced, it will also become very large by accumulating gradually. In addition, DC balance should also be considered.

In view of the characteristics of the electrophoretic display media adopted by the electrophoretic display of the present invention and the above mentioned problems, a driving method is designed to solve the above problems. The driving method of the present invention comprises: 1) defining two gray level changing directions, and defining gradually changing gray levels and quickly changing gray levels in each gray level changing direction; 2) determining a gray level driving scheme based on the initial gray level and the final gray level, the gray level driving scheme comprises at least one gray level driving procedure, each driving procedure corresponds to a gray level changing direction, the final gray level is a gradually changing gray level in the gray level changing direction, which the last driving procedure corresponds to.

Figure 2:
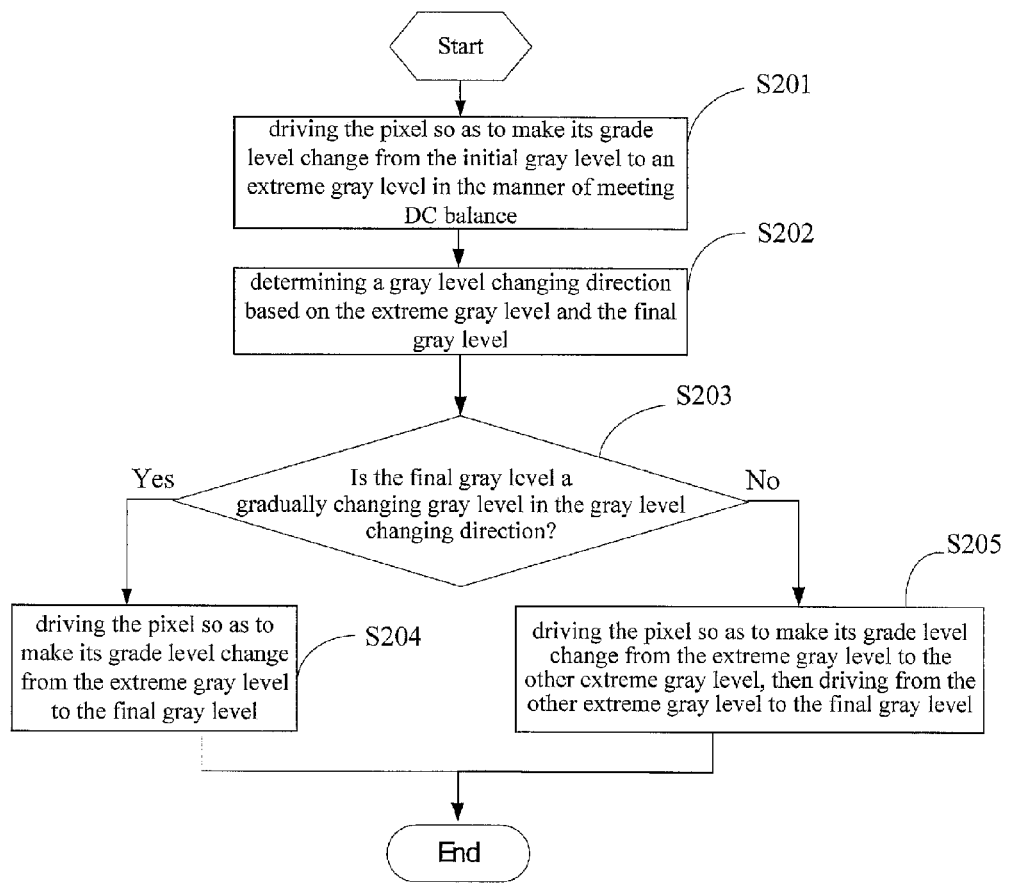
FIG. 2 is a flow chart of the gray level driving scheme in the first embodiment of the present invention.

Please refer to FIG. 2, which is a flow chart of the gray level driving scheme in the first embodiment of the present invention. In the first embodiment of the present invention, the gray level driving scheme comprises the steps of: driving a pixel so as to make its gray level change from the initial gray level to an extreme gray level in the manner of meeting DC balance (S201); determining a gray level changing direction based on the extreme gray level and the final gray level (S202); determining whether the final gray level is a gradually changing gray level in the gray level changing direction (S203); if yes, driving a pixel so as to make its gray level change from the extreme gray level to the final gray level (S204); if not, driving a pixel so as to make its gray level change from the extreme gray level to the other extreme gray level, and then driving the pixel from the other extreme gray level to the final gray level (S205). Wherein, all the manners of meeting DC balance and reducing bias accumulation involved in the present invention refer to: during the gray level changing, if the gray level of a pixel has approached to the other extreme optical state from one extreme optical state, inversely changing of its gray level is not allowed before the gray level of the pixel reaches the other extreme optical state.

Figure 3:
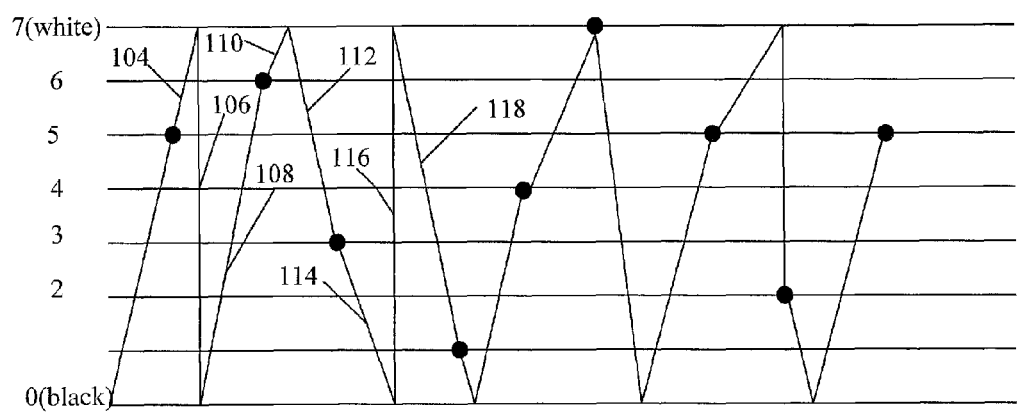
FIG. 3 is a schematic diagram of a gray level changing in the gray level driving scheme as shown in FIG. 2.

Please also refer to FIG. 3, which is a schematic diagram of the gray level changing in the gray level driving scheme as shown in FIG. 2. In order to further explain the gray level driving scheme in the first embodiment of the present invention, the gray level changing process in the gray level driving scheme is explained in combination with FIG. 3.

As shown in FIG. 3, in the case of a pixel being driven so as to make its gray level change from gray level 5 to gray level 6, it is driven so as to make its gray level change from the gray level 5 to extreme optical state 7 first (i.e. step 104), this meets DC balance; it can be seen from the characteristics of the electrophoretic display media as stated above that if it is directly driven from the optical state 7 to the final gray level 6, the final gray level 6 is a non-gradually changing gray level, therefore, it needs to be driven so as to make its gray level change from the extreme gray level 7 to the other extreme gray level 0 (i.e. step 106), and then from the other extreme gray level 0 to the final gray level 6 (i.e. step 108).

In the case of a pixel being driven so as to make its gray level change from the initial gray level 6 to final gray level 3, similarly, it is driven so as to make its gray level change from the gray level 6 to the extreme optical state 7 first (i.e. step 110), which meets DC balance; after it is driven so that its gray level reaches the extreme optical state 7, if it is directly driven so as to make its gray level change from the extreme optical state 7 to the final gray level 3, it can be seen from the characteristics of the electrophoretic display media as stated above that the final gray level is a gradually changing gray level, hence, it can be directly driven so as to make its gray level change from the extreme optical state 7 to the final gray level 3 (i.e. step 112).

In the case of changing the gray level of a pixel from the initial gray level 3 to the final gray level 1, similarly, the pixel is driven so as to make its gray level change from the gray level 3 to the extreme optical state 0 first (i.e. step 114), which meets DC balance; it can be seen from the characteristics of the electrophoretic display media as stated above that if it is directly driven so as to make its gray level change from the optical state 0 to the final gray level 1, the final gray level 1 is a non-gradually changing gray level, therefore, it needs to be driven so as to make its gray level change from the extreme gray level 0 to the other extreme gray level 7 (i.e. step 116), then it is driven so as to make its gray level change from the other extreme gray level 7 to the final gray level 1 (i.e. step 118). Thereby, the principle of the driving method of the present invention is followed by the above gray level driving scheme, which not only meets the DC balance but also ensures relatively accurate gray level control.

Figure 4:
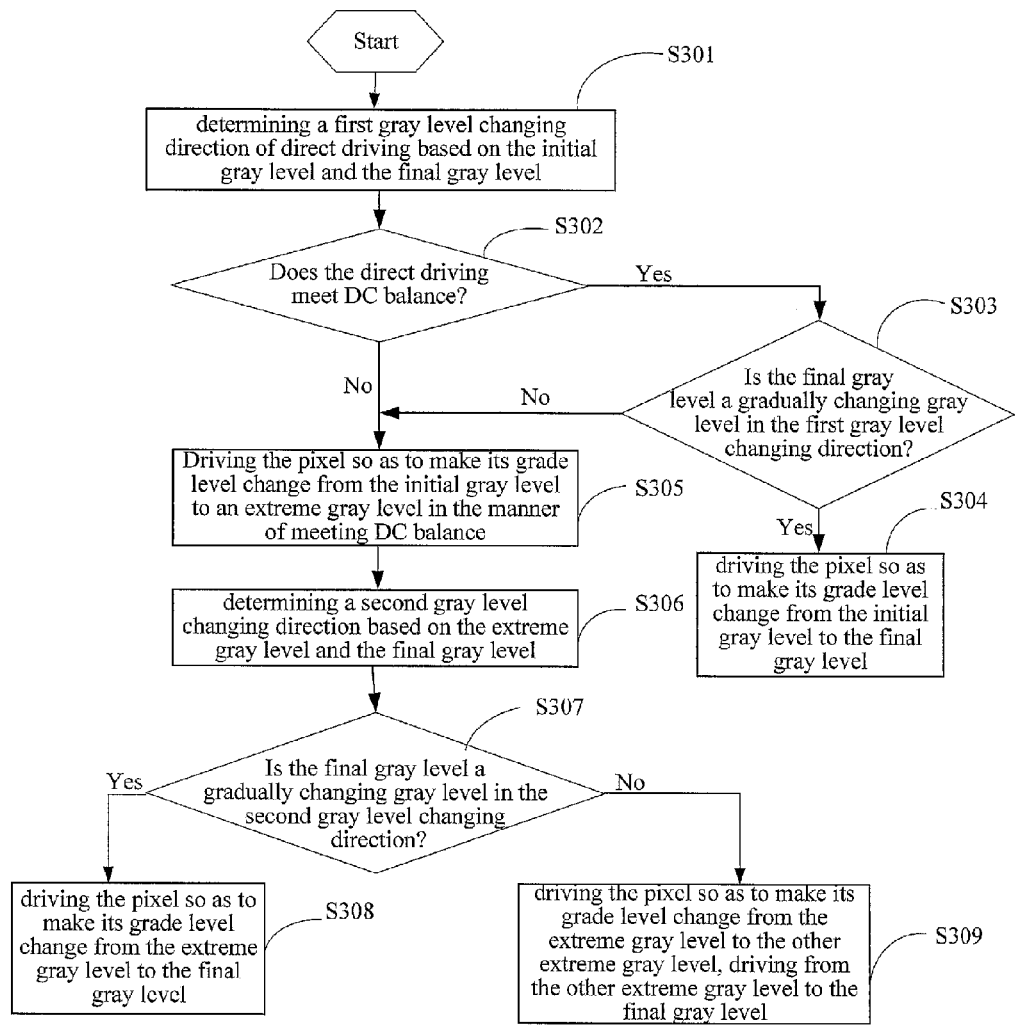
FIG. 4 is a flow chart of a gray level driving scheme in the second embodiment of the present invention.

Please refer to FIG. 4, which is a flow chart of the gray level driving scheme in the second embodiment of the present invention. In the second embodiment, the gray level driving scheme comprises the steps of: determining a first gray level changing direction of direct driving based on the initial gray level and the final gray level (S301); determining whether the direct driving meets DC balance (S302); if it meets DC balance, continuing to determine whether the final gray level is a gradually changing gray level in the first gray level changing direction (S303); if yes, driving a pixel so as to make its gray level change from the initial gray level to the final gray level (S304); if it does not meet DC balance, or it is determined in step S303 that the final gray level is not a gradually changing gray level in the first gray level changing direction, driving the pixel so as to make its gray level change from the initial gray level to an extreme gray level in the manner of meeting DC balance (S305); then determining a second gray level changing direction based on the extreme gray level and the final gray level (S306); determining whether the final gray level is a gradually changing gray level in the second gray level changing direction (S307) after the second gray level changing direction is determined; if yes, driving the pixel so as to make its gray level change from the extreme gray level to the final gray level (S308); if not, driving the pixel so as to make its gray level change from the extreme gray level to the other extreme gray level, and then driving the pixel from the other extreme gray level to the final gray level (S309).

Figure 5:
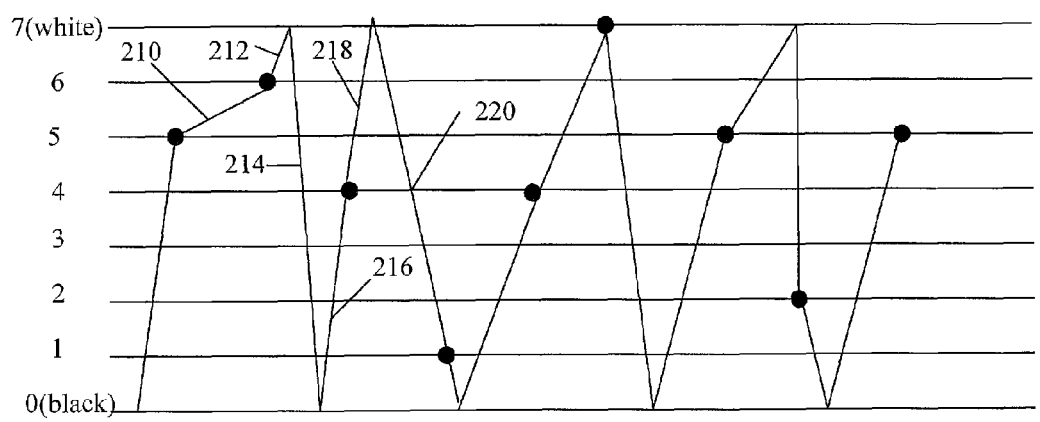
FIG. 5 is a schematic diagram of a gray level changing in the gray level driving scheme as shown in FIG. 4.

Please also refer to FIG. 5, which is a schematic diagram of the gray level changing in the gray level driving scheme as shown in FIG. 4. Similarly, in order to further explain the gray level driving scheme in the second embodiment of the present invention, the gray level changing process in the gray level driving scheme is explained in combination with FIG. 5.

As shown in FIG. 5, in the case of a pixel being driven so as to make its gray level change from gray level 5 to gray level 6, if driving the pixel directly so as to make its gray level change from gray level 5 to gray level 6 meets DC balance, moreover, when the pixel is driven directly so as to make its gray level change from gray level 5 to gray level 6, it can be seen from the characteristics of the electrophoretic display media that the gray level 6 is also a gradually changing gray level, hence, a pixel can be directly driven so as to make its gray level change from gray level 5 to gray level 6 (i.e. step 210).

In the case of a pixel being driven so as to make its gray level change from initial gray level 6 to final gray level 4, if driving the pixel directly so as to make its gray level change from initial gray level 6 to final gray level value 4 does not meet DC balance, hence, it needs to be driven so as to make its gray level change from gray level 6 to extreme optical state 7 first (i.e. step 212), while if it is driven so as to make its gray level change from the extreme optical state 7 to the final gray level value 4, it can be seen from the characteristics of the electrophoretic display media as stated above that the final gray level is a non-gradually changing gray level, hence, it needs to be driven so as to make its gray level change from the extreme optical state 7 to the other extreme optical state 0 first (i.e. step 214), and then from the extreme optical state 0 to the final gray level 4 (i.e. step 216).

In the case of changing the gray level of a pixel from initial gray level 4 to final gray level 1, similarly, driving the pixel directly so as to make its gray level change from gray level 4 to final gray level 1 does not meet DC balance, hence, it needs to be driven so as to make its gray level change from the gray level 4 to the extreme optical state 7 first (i.e. step 218); it can be seen from the characteristics of the electrophoretic display media as stated above that if it is directly driven so as to make its gray level change from the optical state 7 to the final gray level 1, the final gray level 1 is a gradually changing gray level, hence, it can be directly driven so as to make its gray level change from the extreme optical state 7 to the final gray level 1 (i.e. step 220).

The difference between the gray level driving scheme in the first embodiment and that in the second embodiment of the present invention lies in: in the first embodiment, a pixel is always driven so as to make its gray level change to an extreme optical state first in the manner of meeting DC balance, then it is determined whether the final gray level is in a gradually changing region when a pixel is driven so as to make its gray level change from the extreme optical state to the final gray level; whereas in the second embodiment, it is determined first whether driving a pixel so as to make its gray level change from the initial gray level to the final gray level meets DC balance, then it is determined whether the final gray level is in a gradually changing region.

Figure 6:
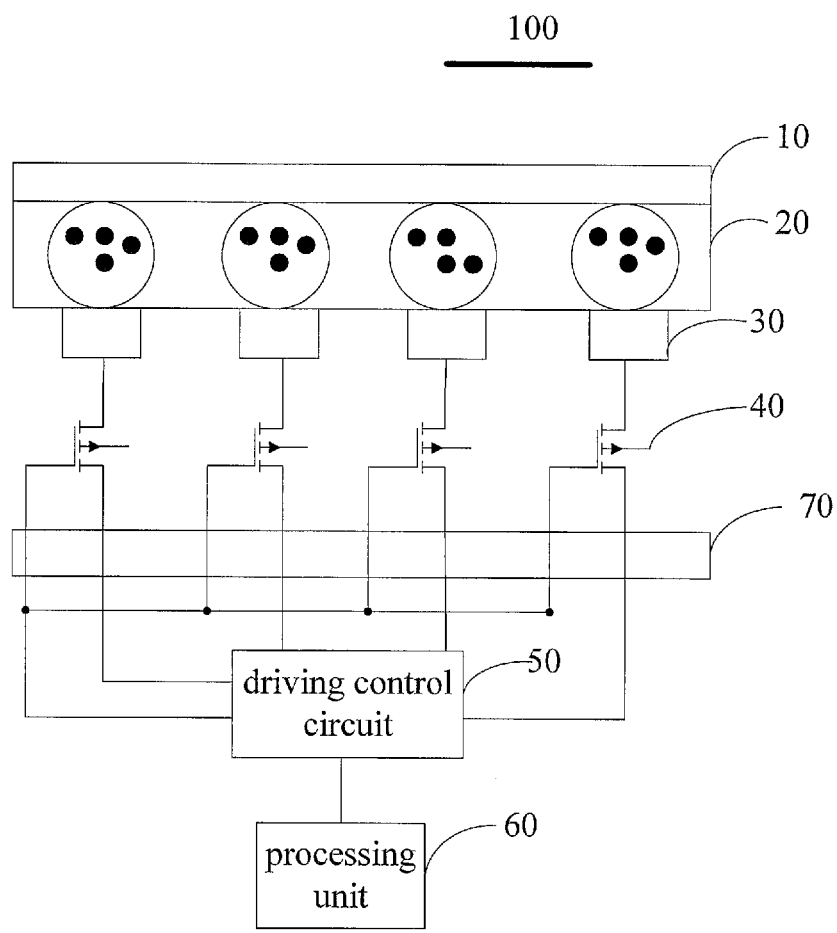
FIG. 6 is a structural diagram of the electrophoretic display in the first embodiment of the present invention.

Please refer to FIG. 6, which is a structural diagram of the electrophoretic display in the first embodiment of the present invention. The electrophoretic display 100 comprises a common electrode layer 10, an electrophoretic layer 20, several pixel electrodes 30, a TFT (Thin Film Transistor) 40, a driving control circuit 50 and a processing unit 60. Wherein the electrophoretic layer 20 is located between the common electrode layer 10 and the several pixel electrodes 30 and electrically connected to them respectively, the TFT 40 is located between the several pixel electrodes 30 and the driving control circuit 50. The driving control circuit 50 is further connected with the processing unit 60, conducts the corresponding TFT 40 under the control of the processing unit 60, and applies a driving waveform to the pixel electrode 30 to which the conducted TFT 40 corresponds. The electrophoretic display 100 further comprises a substrate 70 for carrying the common electrode layer 10, the electrophoretic layer 20, the several pixel electrodes 30, and the TFT 40.

The processing unit 60 is used for receiving a display signal and controlling refreshing of the display screen based on the display signal. Specifically, the processing unit 60 determines based on the display signal the pixel whose gray level needs to be changed, and the final gray level of the pixel whose gray level needs to be changed (i.e. the gray level to which it needs to be changed), and controls the driving control circuit 50 to drive the pixel whose gray level needs to be changed to the final gray level. In the present embodiment, each pixel electrode 30 corresponds to a pixel, the processing unit 60 controls the driving control circuit 50 based on the current gray level value and the final gray level value of each pixel to conduct the corresponding TFT 40 and apply a corresponding driving waveform to the pixel electrode 30, so that one or more different potential differences are formed between the pixel electrode 30 and the common electrode layer 10 to drive the electrophoretic layer to display the required gray level. Apparently, if the screen is refreshed, the gray level value of a certain pixel need not be changed, thus it is not necessary to control its gray level change.

Wherein, the control of the processing unit 60 based on the current gray level value of each pixel and the gray level value to which it needs to be changed is performed according to the preceding driving method of the present invention. That is, the processing unit 60 predefines two gray level changing directions, and defines a gradually changing gray level and a quickly changing gray level in each gray level changing direction. When the processing unit 60 receives a display signal, it determines a pixel whose gray level value needs to be changed, then controls the driving control circuit 50 to conduct the TFT 40 connected by the pixel electrode 30 to which the pixel whose gray level value needs to be changed corresponds, and applies a corresponding driving waveform to the pixel electrode 30, wherein the driving waveform meets the following conditions: the processing unit determines a gray level driving scheme based on the initial gray level and the final gray level, the gray level driving scheme comprises at least one gray level driving procedure, each driving procedure corresponds to a gray level changing direction, the final gray level is a gradually changing gray level in the gray level changing direction which the last driving procedure corresponds to.

The gray level driving scheme comprises the gray level driving scheme in the first embodiment and the gray level driving scheme in the second embodiment of the present invention.

By means of the electrophoretic display of the present invention and the driving method thereof, the gray level of the pixels can be accurately controlled to change to the required gray levels and the DC balance can be met.

The above are only the preferred embodiments of the present invention, however, the protection scope of the present invention is not limited to them, any modification or replacement within the technical scope disclosed by the present invention that can be easily conceived by a person skilled in the art should be covered within the protection scope of the present invention. Therefore, the protection scope of the present invention shall be based on the protection scope of the claims.

What is claimed is:

1. A method of driving an electrophoretic display, comprising:
providing the electrophoretic display having;
a common electrode layer;
an electrophoretic layer;
a plurality of pixel electrodes each of which corresponds to a pixel;
a thin film transistor;
a driving control circuit; and
a processing unit;
defining two gray level changing direction as the directions of a change toward an intermediate gray level from either of the two extreme gray levels of the electrophoretic display, and defining gradually changing gray levels and quickly changing gray levels in relation to a gray level changing direction, as the gray levels respectively less close and closer to the extreme gray level, from which the change in gray level occurs, than a predetermined gray level;
determining a driving scheme of the electrophoretic display based on the initial gray level and the final gray level of a pixel, whose gray level value needs to be changed;
applying a display signal of the driving scheme to the pixel electrode to control the pixel whose gray level value needs to be changed;
wherein the driving scheme comprises at least one gray level driving procedure, each driving procedure changing the gray level in a gray level changing direction, the final gray level being gradually changing gray level in the gray level changing direction of the last driving procedure, by which the final gray level is finally attained;
driving the pixel, whose gray level value needs to be changed, so as to make its gray level change from the initial gray level to an extreme gray level so as to maintain DC balance; then
determining a gray level changing direction based on the extreme gray level and the final gray level of the pixel, whose gray level value needs to be changed; then
determining whether the final gray level is a gradually changing gray level in the gray level changing direction; and
if yes, driving the pixel, whose gray level value needs to be changed; so as to make its gray level change from the extreme gray level to the final gray level; and
if not, driving the pixel, whose gray level value needs to be changed; so as to make its gray level change from the extreme gray level to the other extreme gray level, and then driving the pixel from the other extreme gray level to the final gray level.

2. The method as claimed in claim 1, wherein DC balance is maintained during the process of gray level changing of the pixel, whose gray level needs to be changed, so that the time integration sum of the positive voltage and negative voltage applied to the pixel is zero for a predetermined period, so that if the gray level of the pixel has approached a first extreme optical state from a second extreme optical state, reversing the gray level changing direction is not allowed before the pixel reaches the first extreme optical state.

3. An electrophoretic display, comprising:
a common electrode layer;
an electrophoretic layer;
a plurality of pixel electrodes each of which corresponds to a pixel;
a thin film transistor;
a processing unit; and
a driving control circuit,
wherein the processing unit is used for defining two gray level changing directions, and defining gradually changing gray levels and quickly changing gray levels in relation to a gray level changing direction;
wherein the processing unit is also used for controlling the driving control circuit to conduct the TFT connected to the pixel electrode corresponding to the pixel whose gray level value needs to be changed
wherein the processing unit is also used for controlling the driving control circuit to apply the driving scheme based on the initial gray level and the final gray level of the pixel, whose gray level value needs to be changed, to the pixel electrode via the conducted TFT, to control that pixel,
wherein applying the driving scheme to the pixel electrode to control the pixel whose gray level value needs to be changed comprises the at least one gray level driving procedure, each driving procedure changing a gray level in the grey level changing direction, the grey level being a gradually changing gray level or a quickly changing gray level, the final gray level being attained by a gradually changing gray level in the gray level changing direction which the last driving procedure corresponds to;
wherein the driving control circuit is used for connecting the TFT, receiving a control signal transmitted by the processing unit, and refreshing the TFT to display screen; and
wherein the processing unit is configured for;
driving the pixel, whose gray level value needs to be changed, so as to make its gray level change from the initial gray level to an extreme gray level so as to maintain DC balance;
determining a gray level changing direction based on the extreme gray level and the final gray level of the pixel whose gray level value needs to be changed;
determining whether the final gray level is a gradually changing gray level in the gray level changing direction;
if yes, driving the pixel, whose gray level value needs to be changed, so as to make its gray level change from the extreme gray level to the final gray level; and
if not, driving the pixel, whose gray level value needs to be changed, so as to make its gray level change from the extreme gray level to the other extreme gray level, and then driving the pixel from the other extreme gray level to the final gray level.

4. The electrophoretic display as claimed in claim 3, wherein the processing unit drives the pixel, whose gray level value needs to be changed, so as to make its gray level change from the initial gray level to an extreme gray level so as to maintain DC balance;
wherein the processing unit determines a gray level changing direction based on the extreme gray level and the final gray level of the pixel, whose gray level value needs to be changed; and
wherein the processing unit determines whether the final gray level is a gradually changing gray level in the gray level changing direction; and
if yes, driving the pixel, whose gray level value needs to be changed, so as to make its gray level change from the extreme gray level to the final gray level; and
if not, driving the pixel, whose gray level value needs to be changed, so as to make its gray level change from the extreme gray level to the other extreme gray level, and then driving the pixel from the other extreme gray level to the final gray level.

5. The electrophoretic display as claimed in claim 4, wherein DC balance is maintained during the process of gray level changing of the pixel, whose gray level value needs to be changed, so that the time integration sum of the positive voltage and negative voltage applied to the pixel is zero for a predetermined period, so that if the gray level of the pixel has approached a first extreme optical state from a second extreme optical state, reversing the gray level changing direction is not allowed before the pixel reaches the first extreme optical state.

* * * * *